(12) United States Patent
Reed

(10) Patent No.: US 12,465,033 B2
(45) Date of Patent: Nov. 11, 2025

(54) HEATED FISHING POLE ASSEMBLY

(71) Applicant: Robert Reed, Wheeler, MI (US)

(72) Inventor: Robert Reed, Wheeler, MI (US)

( * ) Notice: Subject to any disclaimer, the term of this patent is extended or adjusted under 35 U.S.C. 154(b) by 17 days.

(21) Appl. No.: 18/101,361

(22) Filed: Jan. 25, 2023

(65) Prior Publication Data

US 2024/0245042 A1 Jul. 25, 2024

(51) Int. Cl.
*A01K 87/08* (2006.01)

(52) U.S. Cl.
CPC .................................. *A01K 87/085* (2013.01)

(58) Field of Classification Search
CPC .... A01K 87/085; A01K 87/00; A01K 87/007; A01K 87/008; A01K 87/08
USPC .......................................... 43/18.1 R, 23, 25
See application file for complete search history.

(56) References Cited

U.S. PATENT DOCUMENTS

| | | | | |
|---|---|---|---|---|
| 3,164,921 A | * | 1/1965 | Mavrakis | A01K 87/04 |
| | | | | 242/157 R |
| 3,873,915 A | * | 3/1975 | Hayes | G01R 31/52 |
| | | | | 324/506 |
| 3,981,095 A | * | 9/1976 | Shepherd | A01K 91/065 |
| | | | | 43/19.2 |
| 4,584,787 A | * | 4/1986 | Aho | A61F 7/034 |
| | | | | 126/204 |
| 4,598,192 A | | 7/1986 | Garrett | |
| 5,175,953 A | | 1/1993 | Lesnock | |
| 5,517,786 A | * | 5/1996 | Peissig | A01K 87/085 |
| | | | | 43/18.1 R |
| D380,806 S | * | 7/1997 | Ostrander | D22/139 |
| 5,644,864 A | * | 7/1997 | Kelly | A01K 87/007 |
| | | | | 43/17.5 |
| 5,655,328 A | | 8/1997 | Childs | |
| D635,637 S | * | 4/2011 | Pekin | D22/138 |
| 9,918,459 B2 | | 3/2018 | Laws | |
| D823,428 S | | 7/2018 | Stender | |
| 10,136,625 B2 | | 11/2018 | Chapman | |
| 11,044,898 B2 | | 6/2021 | Deeb | |
| 2003/0019145 A1 | * | 1/2003 | Lybarger | A01K 87/007 |
| | | | | 43/17.5 |
| 2015/0116992 A1 | * | 4/2015 | Massey | F21L 4/02 |
| | | | | 362/184 |
| 2017/0325439 A1 | * | 11/2017 | Chapman | A01K 87/085 |
| 2018/0146651 A1 | | 5/2018 | Leiberg | |
| 2018/0213758 A1 | * | 8/2018 | Deeb | A41D 19/0024 |
| 2021/0137085 A1 | * | 5/2021 | Cherry | H05B 3/0014 |
| 2021/0188505 A1 | * | 6/2021 | Bazile | B65B 13/027 |

FOREIGN PATENT DOCUMENTS

GB 2082032 8/1981

* cited by examiner

*Primary Examiner* — William L Gmoser

(57) ABSTRACT

A heated fishing pole assembly for inhibiting the formation of ice on a fishing pole includes a fishing pole that has a handle, a rod extending away from the handle and a plurality of line guides distributed along the rod. A handle heating element is integrated into the handle of the fishing pole to heat the handle thereby inhibiting the formation of ice on the handle. A rod heating element is integrated into the rod of the fishing pole to heat each of the plurality of line guides thereby inhibiting the formation of ice on the plurality of line guides. A power indicator is integrated into the rod to indicate a power level of each of the handle heating element and the rod heating element.

6 Claims, 2 Drawing Sheets

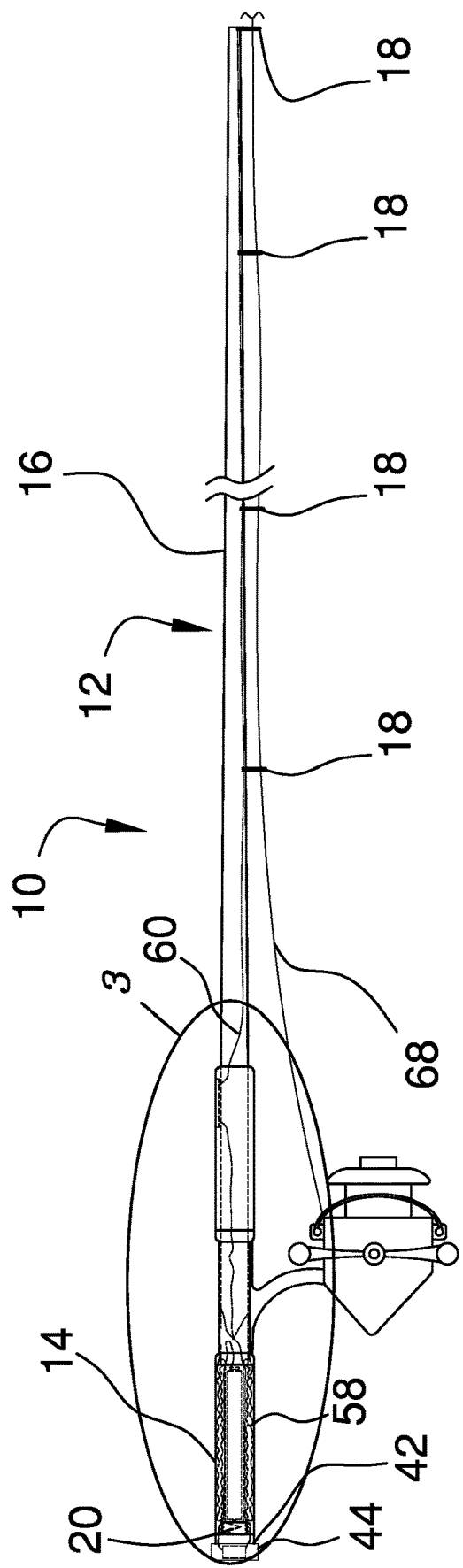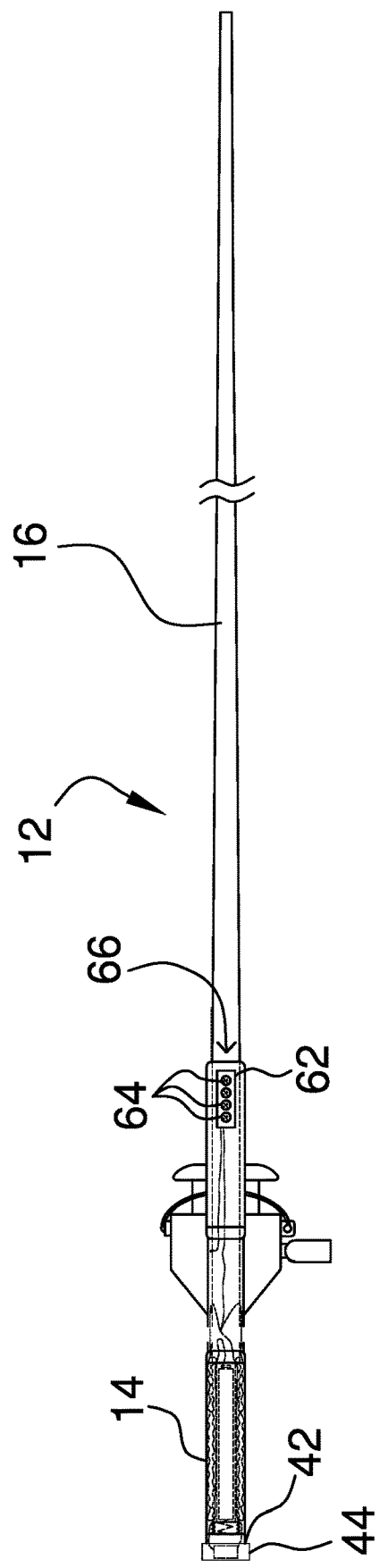

HEATED FISHING POLE ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to fishing pole devices and more particularly pertains to a new fishing pole device for inhibiting the formation of ice on a fishing pole. The device includes a fishing pole that has a handle heating element in a handle of the fishing pole and a rod heating element in line guides on the fishing pole. The device includes a power supply positioned within the handle and a power knob rotatably attached to the handle for turning the rod heating element and the handle heating element on and off. The device includes a power indicator integrated into the handle for indicating a charge level of the power supply.

(2) Description of Related Art Including Information Disclosed Under 37 CFR 1.97 and 1.98

The prior art relates to fishing pole devices including a heated handle for fishing rods. The prior art discloses a variety of fishing poles that each at least includes a heating element integrated into eyelets of the fishing pole to inhibit ice formation on the eyelets. The prior art discloses a fishing rod heater that is wrapped around a handle of a fishing rod. The prior art discloses a variety of fishing rods that each at least includes a heating element integrated into a handle of a fishing rod to warm the handle.

BRIEF SUMMARY OF THE INVENTION

An embodiment of the disclosure meets the needs presented above by generally comprising a fishing pole that has a handle, a rod extending away from the handle and a plurality of line guides distributed along the rod. A handle heating element is integrated into the handle of the fishing pole to heat the handle thereby inhibiting the formation of ice on the handle. A rod heating element is integrated into the rod of the fishing pole to heat each of the plurality of line guides thereby inhibiting the formation of ice on the plurality of line guides. A power indicator is integrated into the rod to indicate a power level of each of the handle heating element and the rod heating element.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 1 is a right side phantom view of a heated fishing pole assembly according to an embodiment of the disclosure.

FIG. 2 is a top phantom view of an embodiment of the disclosure.

DETAILED DESCRIPTION OF THE INVENTION

Figure 3:
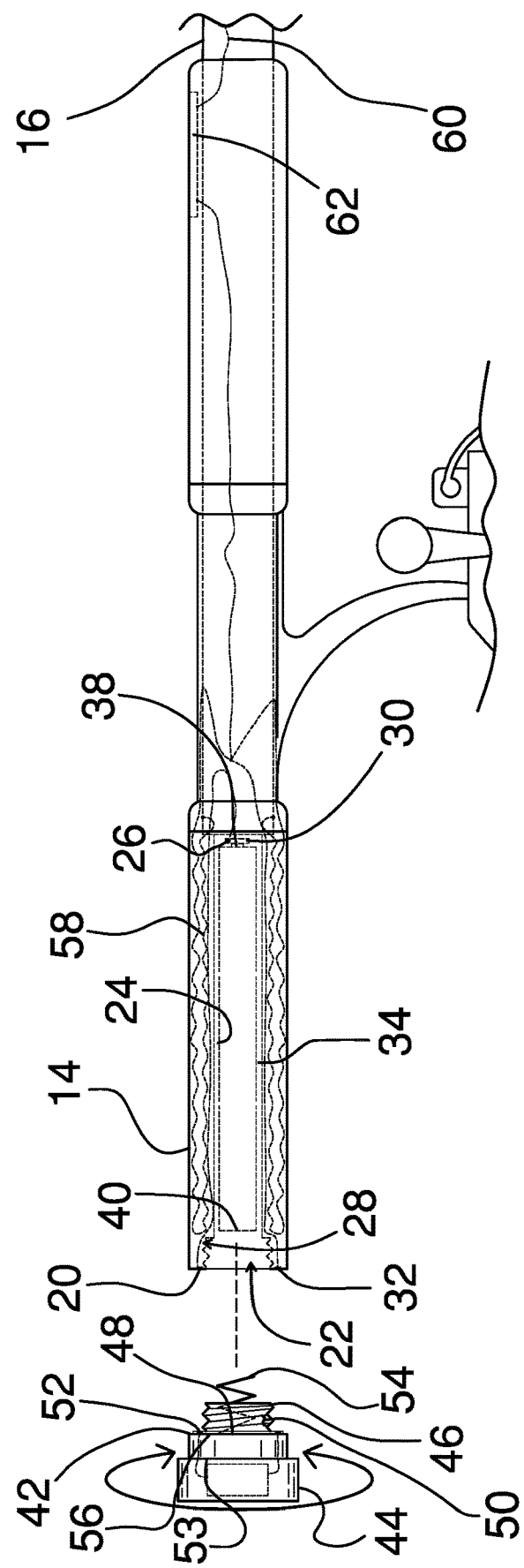
FIG. 3 is an enlarged detail view taken from circle 3 of FIG. 1 of an embodiment of the disclosure.

With reference now to the drawings, and in particular to FIGS. 1 through 3 thereof, a new fishing pole device embodying the principles and concepts of an embodiment of the disclosure and generally designated by the reference numeral 10 will be described.

As best illustrated in FIGS. 1 through 3, the heated fishing pole assembly 10 generally comprises a fishing pole 12 that has a handle 14 and a rod 16 extending away from the handle 14 and the fishing pole 12 has a plurality of line guides 18 distributed along the rod 16. The handle 14 has a distal end 20 with respect to the rod 16 and the distal end 20 has a battery well 22 extending toward the rod 16. The battery well 22 has a lateral bounding surface 24 and a lower bounding surface 26 and the lateral bounding surface 24 has threads 28 extending from the distal end 20 toward the lower bounding surface 26. A first electrical contact 30 is integrated into the lower bounding surface 26 of the battery well. A second electrical contact 32 is integrated into the distal end 20 of the handle 14 and the second electrical contact 32 surrounds the battery well 22.

A power supply 34 is insertable into the battery well 22 in the handle 14 and the power supply 34 has a primary electrical contact 38 and a secondary electrical contact 40. The primary electrical contact 38 is in electrical communication with the first electrical contact 30 when the power supply 34 is inserted into the battery well 22. The power supply 34 comprises at least one battery. A cap 42 is removably attachable to the handle 14 and a power knob 44 is rotatably integrated into the cap 42. The power knob 44 is rotatable between an on position and an off position.

The cap 42 includes a plug 46 extending away from a front end 48 of the cap 42 and the plug 46 has an outer surface 50 that is threaded. The battery well 22 in the distal end 20 of the handle 14 insertably receives the plug 46 having the outer surface 50 threadably engaging the threads 28 in the lateral bounding surface 24 of the battery well 22. The cap 42 has a third electrical contact 52 that is integrated into the front end 48 of the cap 42 and the third electrical contact 52 surrounds the plug 46. Furthermore, the third electrical contact 52 is in electrical communication with the second electrical contact 32 when the plug 46 is threaded into the battery well 22.

The power knob 44 is rotatably disposed on a back end 53 of the cap 42 and the power knob 44 is electrically coupled to the third electrical contact 52. The plug 46 has a spring 54 extending away from the plug 46 and the spring 54 is comprised of an electrically conductive material. The spring 54 abuts the secondary electrical contact 40 on the power supply 34 when the plug 46 is threaded into the battery well 22 and the spring 54 is electrically coupled to the power knob 44. The power knob 44 completes a circuit between the spring 54 and the third electrical contact 52 when the power knob 44 is rotated into the on position thereby facilitating the first electrical contact 30 to receive electrical current from the power supply 34. Conversely, the power knob 44 opens the circuit between the spring 54 and the third electrical contact 52 when the power knob 44 is rotated into the off position thereby inhibiting the first electrical contact 30 from receiving electrical current from the power supply 34. A gasket 56 surrounds the plug 46 and the gasket 56 is compressed between the front end 48 of the cap 42 and the distal end 20 of the handle 14 when the plug 46 is threaded into the battery well 22. The gasket 56 is comprised of a fluid impermeable material to inhibit fluid from entering the battery well 22.

A handle heating element 58 is integrated into the handle 14 of the fishing pole 12. The handle heating element 58 is in thermal communication with the handle 14 such that the handle heating element 58 heats the handle 14 when the handle heating element 58 is turned on. In this way the handle heating element 58 inhibits the formation of ice on the handle 14. The handle heating element 58 is electrically coupled to the first electrical contact 30. The handle heating element 58 is in electrical communication with the power supply 34 when the power knob 44 is rotated into the on position. Conversely, the handle heating element 58 is removed from electrical communication with the power supply 34 when the power knob 44 is rotated into the off position. The handle heating element 58 may comprise an electric heating element or the like with an operational temperature ranging between approximately 80.0 degrees Fahrenheit and 100.0 degrees Fahrenheit.

A rod heating element 60 is integrated into the rod 16 of the fishing pole 12 and the rod heating element 60 is integrated into each of the plurality of line guides 18. The rod heating element 60 is in thermal communication with each of the plurality of line guides 18. Additionally, the rod heating element 60 heats each of the plurality of line guides 18 when the rod heating element 60 is turned on. In this way the rod heating element 60 inhibits the formation of ice on the plurality of line guides 18. The rod heating element 60 is in electrical communication with the handle heating element 58. Additionally, the rod heating element 60 may comprise an electric heating element or the like with an operational temperature ranging between approximately 80.0 degrees Fahrenheit and 100.0 degrees Fahrenheit.

A power indicator 62 is integrated into the rod 16 and the power indicator 62 is in electrical communication with each of the handle heating element 58 and the rod heating element 60. In this way the power indicator 62 can indicate a power level of each of the handle heating element 58 and the rod heating element 60. The power indicator 62 includes a plurality of light emitters 64 which emit light outwardly from the power indicator 62. Each of the plurality of light emitters 64 is electrically coupled to each of the rod heating element 60 and the handle heating element 58. Furthermore, the plurality of light emitters 64 is arranged into a row 66 extending along a lengthwise axis of the rod 16. The plurality of light emitters 64 is sequentially illuminated to correspond with a charge level of the power supply 34 to visually communicate the charge level of the power supply 34. Additionally, each of the plurality of light emitters 64 may comprise a light emitting diode or other similar type of electronic light emitter.

In use, the power knob 44 is rotated into the on position to turn on the handle heating element 58 and the rod heating element 60. In this way ice is inhibited from forming on the handle 14 and the line guides 18 while ice fishing. Thus, fishing line 68 on the fishing pole 12 will not become frozen to the line guides 18 thereby facilitating the fishing pole 12 to function properly while ice fishing. Additionally, the handle heating element 58 can warm a fisherman's hands while the fisherman is holding the handle 14. The power supply 34 is replaced when the light emitters 64 indicate that the charge level of the power supply 34 has been depleted.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A heated fishing pole assembly for inhibiting the formation of ice on line guides of a fishing pole, said assembly comprising:
   a fishing pole having a handle and a rod extending away from said handle, said fishing pole having a plurality of line guides being distributed along said rod;
   a cap being removably attachable to said handle, said cap having a power knob being rotatably integrated into said cap, said power knob being rotatable between an on position and an off position;
   a handle heating element being integrated into said handle of said fishing pole, said handle heating element being in thermal communication with said handle such that said handle heating element heats said handle when said handle heating element is turned on wherein said handle heating element is configured to inhibit the formation of ice on said handle;

a rod heating element being integrated into said rod of said fishing pole, said rod heating element being integrated into each of said plurality of line guides, said rod heating element being in thermal communication with each of said plurality of line guides, said rod heating element heating each of said plurality of line guides when said rod heating element is turned on wherein said rod heating element is configured to inhibit the formation of ice on said plurality of line guides, said rod heating element being in electrical communication with said handle heating element;

a power indicator being integrated into said rod, said power indicator being in electrical communication with each of said handle heating element and said rod heating element thereby facilitating said power indicator to indicate a power level of each of said handle heating element and said rod heating element;

wherein said handle has a distal end with respect to said rod, said distal end having a battery well extending toward said rod, said battery well having a lateral bounding surface and a lower bounding surface, said lateral bounding surface having threads extending from said distal end toward said lower bounding surface;

wherein said assembly includes a first electrical contact being integrated into said lower bounding surface of said battery well;

wherein said assembly includes a second electrical contact being integrated into said distal end of said handle, said second electrical contact surrounding said battery well;

a power supply being insertable into said battery well in said handle, said power supply having a primary electrical contact and a secondary electrical contact, said primary electrical contact being in electrical communication with said first electrical contact when said power supply is inserted into said battery well;

wherein said cap includes a plug extending away from a front end of said cap, said plug having an outer surface being threaded, said battery well in said distal end of said handle insertably receiving said plug having said outer surface threadably engaging said threads in said lateral bounding surface of said battery well;

wherein cap has a third electrical contact being integrated into said front end of said cap, said third electrical contact surrounding said plug, said third electrical contact being in electrical communication with said second electrical contact when said plug is threaded into said battery well;

wherein said power knob is rotatably disposed on a back end of said cap, said power knob being electrically coupled to said third electrical contact;

wherein said plug has a spring extending away from said plug, said spring being comprised of an electrically conductive material, said spring abutting said secondary electrical contact on said power supply when said plug is threaded into said battery well, said spring being electrically coupled to said power knob.

2. The assembly according to claim 1, wherein:
said power knob completes a circuit between said spring and said third electrical contact when said power knob is rotated into said on position thereby facilitating said first electrical contact to receive electrical current from said power supply; and said power knob opens said circuit between said spring and said third electrical contact when said power knob is rotated into said off position thereby inhibiting said first electrical contact from receiving electrical current from said power supply.

3. The assembly according to claim 1, further comprising a gasket surrounding said plug, said gasket being compressed between said front end of said cap and said distal end of said handle when said plug is threaded into said battery well, said gasket being comprised of a fluid impermeable material wherein said gasket is configured to inhibit fluid from entering said battery well.

4. The assembly according to claim 1, wherein said handle heating element is electrically coupled to said first electrical contact, said handle heating element being in electrical communication with said power supply when said power knob is rotated into said on position, said handle heating element being removed from electrical communication with said power supply when said power knob is rotated into said off position.

5. The assembly according to claim 1, wherein said power indicator includes a plurality of light emitters, each of said plurality of light emitters being electrically coupled to each of said rod heating element and said handle heating element, said plurality of light emitters being arranged into a row extending along a lengthwise axis of said rod, said plurality of light emitters being sequentially illuminated to correspond with a charge level of said power supply to visually communicate said charge level of said power supply.

6. A heated fishing pole assembly for inhibiting the formation of ice on line guides of a fishing pole, said assembly comprising:

a fishing pole having a handle and a rod extending away from said handle, said fishing pole having a plurality of line guides being distributed along said rod, said handle having a distal end with respect to said rod, said distal end having a battery well extending toward said rod, said battery well having a lateral bounding surface and a lower bounding surface, said lateral bounding surface having threads extending from said distal end toward said lower bounding surface;

a first electrical contact being integrated into said lower bounding surface of said battery well;

a second electrical contact being integrated into said distal end of said handle, said second electrical contact surrounding said battery well;

a power supply being insertable into said battery well in said handle, said power supply having a primary electrical contact and a secondary electrical contact, said primary electrical contact being in electrical communication with said first electrical contact when said power supply is inserted into said battery well;

a cap being removably attachable to said handle, said cap having a power knob being rotatably integrated into said cap, said power knob being rotatable between an on position and an off position, said cap including a plug extending away from a front end of said cap, said plug having an outer surface being threaded, said battery well in said distal end of said handle insertably receiving said plug having said outer surface threadably engaging said threads in said lateral bounding surface of said battery well, cap having a third electrical contact being integrated into said front end of said cap, said third electrical contact surrounding said plug, said third electrical contact being in electrical communication with said second electrical contact when said plug is threaded into said battery well, said power knob being rotatably disposed on a back end of said cap, said power knob being electrically coupled to said third electrical contact, said plug having a spring extending away from said plug, said spring being comprised of an electrically conductive material, said spring abutting said secondary electrical contact on said power supply when said plug is threaded into said battery well, said spring being electrically coupled to said power knob, said power knob completing a circuit between said spring and said third electrical contact when said power knob is rotated into said on position thereby facilitating said first electrical contact to receive electrical current from said power supply, said power knob opening said circuit between said spring and said third electrical contact when said power knob is rotated into said off position thereby inhibiting said first electrical contact from receiving electrical current from said power supply;

a gasket surrounding said plug, said gasket being compressed between said front end of said cap and said distal end of said handle when said plug is threaded into said battery well, said gasket being comprised of a fluid impermeable material wherein said gasket is configured to inhibit fluid from entering said battery well;

a handle heating element being integrated into said handle of said fishing pole, said handle heating element being in thermal communication with said handle such that said handle heating element heats said handle when said handle heating element is turned on wherein said handle heating element is configured to inhibit the formation of ice on said handle, said handle heating element being electrically coupled to said first electrical contact, said handle heating element being in electrical communication with said power supply when said power knob is rotated into said on position, said handle heating element being removed from electrical communication with said power supply when said power knob is rotated into said off position;

a rod heating element being integrated into said rod of said fishing pole, said rod heating element being integrated into each of said plurality of line guides, said rod heating element being in thermal communication with each of said plurality of line guides, said rod heating element heating each of said plurality of line guides when said rod heating element is turned on wherein said rod heating element is configured to inhibit the formation of ice on said plurality of line guides, said rod heating element being in electrical communication with said handle heating element; and a power indicator being integrated into said rod, said power indicator being in electrical communication with each of said handle heating element and said rod heating element thereby facilitating said power indicator to indicate a power level of each of said handle heating element and said rod heating element, said power indicator including a plurality of light emitters wherein each of said light emitters is configured to emit light outwardly from said power indicator, each of said plurality of light emitters being electrically coupled to each of said rod heating element and said handle heating element, said plurality of light emitters being arranged into a row extending along a lengthwise axis of said rod, said plurality of light emitters being sequentially illuminated to correspond with a charge level of said power supply to visually communicate said charge level of said power supply.

* * * * *